Patented Oct. 9, 1934

1,975,884

UNITED STATES PATENT OFFICE 1,975,884

MOLDABLE RESINOID

George S. Welth, Caldwell, N. J., assignor to Bakelite Corporation, New York, N. Y., a corporation of Delaware No Drawing. Application November 20, 1928, Serial No. 320,766

12 Claims. (Cl. 260—4)

This invention relates to phenolic resin-like compositions of a moldable character, more specifically to such compositions free from any fibrous or inorganic filler, to processes of manufacturing and treating such compositions and to articles made therefrom.

As is well known, phenols and methylene-containing substances, such as formaldehyde and its polymers, can be reacted in the presence of catalytic or condensing agents to yield transparent ember-like materials, that are generally designated as resinoids on account of properties which differentiate them from natural resins. As generally practised, the resinoid reaction is divided into stages, the product of the initial reaction or A-stage being solid when cold, but still soluble and fusible; continued heating of the A stage product transforms it gradually to a final C stage product, which is infusible and resistant to practically all ordinary reagents; and this transformation consists of a polymerization accompanied by a decided shrinkage of the resinoids. To counteract the shrinkage and to further render the product useful as a molding material, it is customary to admix a relatively large proportion of fibrous filler, such as wood flour, with the A stage product and partially harden or advance the resinoid binder by working the mixture with heated rolls to give proper molding properties. The completion of the hardening or transformation of the resinoid is obtained while it is in a mold through the application of heat and pressure. Such molding mixtures have found an extensive application commercially on account of their useful mechanical and electrical properties, but the characteristics of transparency, color, etc., which make the resinoids attractive as decorative material are completely lost. Where those characteristics are to be retained, the admixture of fillers of a fibrous or inorganic nature to any appreciable extent is not desirable, and it has generally been the practice, prior to the present invention, to cast the A-stage product while fluid into slabs or other simple shapes and then submit the slabs to a baking under pressure to secure polymerization or hardening to the C-stage during which operation the shrinkage occurs. The hardened slabs can be cut and machined into various articles, such as beads, pipe bits, etc., and polished. These operations involve not only a large wastage of material, but a labor expense that usually constitutes the major part of the cost of the finished articles.

That commercial development has been restricted to these practises may be due to the fact that resinoids are obtainable when there is present a methylene radical to react with each phenol molecule; for example, if formaldehyde is reacted with phenol, equimolecular proportions are sufficient, or if hexamethylenetetramine is used, the proportions are in the ratio of 6 moles of phenol to one of hexamethylene tetramine. However, such resinoids, apart from shrinkage, are not practicably moldable per se, for if advanced or hardened sufficiently to give the resistance to flow necessary to prevent exudation in a molding operation, they have a decided tendency to crumble during the operation. While it has been proposed to impart welding properties to these resinoids in their hardened condition by incorporating softening agents, such as naphthalene compounds, etc., these additions likewise have the effect of causing them to become thermoplastic or fusible upon heating; and strength as well as the resinoid property of becoming infusible upon hardening, to which properties are due the commercial usefulness of articles made therefrom, are then sacrificed.

The present invention provides phenolic resinoid compositions that are differentiated from hitherto known resinoid products in being moldable; that is, they can be obtained in a solid state sufficiently hardened or advanced to avoid exudation from the mold during the act of molding under heat and pressure, yet having the property of free flow to completely fill out the mold when heat and pressure is applied to yield homogeneous or continuous hardened articles having the characteristics of color, transparency, etc., of the non-molded, that is, cast resinoids and a strength substantially equal to those machined from the same products. Where the conformation of the mold permits, the compositions can be placed therein in a solid single piece or block and the block, preferably preheated, then crushed to fill out the mold by the pressure of the force or plunger; or the resinoid can be ground into a powder of any degree or coarseness or fineness and the mold charged with the powder. In the description and claims that follow the term crushing is used in a generic sense to cover either the crushing of a block in a mold or a grinding preliminary to charging to secure a distribution of the material.

In the preparaton of resinoid compositions having this moldable property to a commercial degree I have found it essential to use haxamethylenetetramine or its equivalent (that is, proper proportions of formaldehyde and ammonia), as the methylene-containing agent for reaction with phenol or other phenolic body. Furthermore I have found that a material excess of hexamethylenetetramine over that theoretically required for a resinoid (one formula weight of hexamethylenetetramine to six of phenol) is required and preferably in the ratio of about one mole of hexamethylenetetramine to three moles of the phenolic body; if much less hexamethylenetetramine than this proportion is used, say 1 hexamethylenetetramine to 4 phenol, the reaction becomes more violent and the molding property becomes less evident; and if much in excess, the hexamethylenetetramine tends to separate out and act as a diluent or impurity weakening the structure. In addition I have discovered that this property of being moldable is exhibited in an intermediate state of hardness of the resinoids here disclosed, for they can be polymerized or advanced toward the C state to such a degree that they are no longer moldable for practical purposes.

When phenol alone is reacted with hexamethylenetetramine in the proportions indicated, the reaction is violent and difficult to control. I therefore prefer to substitute for a portion of the phenol an equivalent amount of o-cresol which has the effect of retarding the reaction. O-cresol, however, also slows up the molding operation and I therefore limit such additions to as small proportions as practical, since molding operations to be commercially feasible must be held within a short time cycle of a few minutes.

While a phenol and hexamethylenetetramine reaction product that is moldable without the addition of other ingredients can be prepared as described, shrinking is apt to occur during molding to the extent of causing cracks in the molded articles. I have found that this can be avoided by the inclusion of solvents or plasticizing agents, such as amyl acetate, chlorinated naphthalene and in fact practically all solvents or plasticizing agents, liquid or solid, known to the resinoid art. However, volatile solvents, such as alcohol or acetone, are apt to impart a coloration to the composition that is not generally desirable or may prove objectionable on account of their easy volatility.

As illustrative of a suitable composition the following specific example is given, it being understood that the invention is not restricted to the components or proportions mentioned.

Phenol 175 to 190 gms. o-cresol 25 to 10 gms., hexamethylenetetramine 86 gms. and monochlornaphthalene 65 gms. are mixed together. To this is added about 2 cc. of butyl stearate and about 5 cc. of tung oil when a cloudy effect is desired, or about 1.5 cc. of castor oil can be substituted when a clear resinoid material is wanted. The small addition of castor oil serves to increase the toughness of the molded article and it likewise assists in improving the molding characteristics of the composition by preventing crazing. The mixture is heated in an open vessel until the reaction begins which occurs at about 135° C. As the reaction is violent, the heat is removed after the reaction begins, and the mass is stirred thoroughly; during this reaction period the temperature may rise to about 150° C. and for large quantities it may be found necessary to cool as well as to agitate to control the temperature. When the temperature has dropped to about 120 to 125° C. and the mass shows signs of thickening, the product is poured into shallow containers. The pouring operation effectually checks further reaction as the temperature falls below 100° C. The containers are heated gradually, preferably in a bakelizer where they are maintained at about 120° C. under gas pressure of about 80 pounds for about 3 hours. The product is now in a sufficiently hard solid condition so that it can be ground or broken when cooled to room temperatures, and it is preferably ground into a coarse powder of about one quarter inch mesh. The product furthermore is sufficiently advanced or hardened for compression in a mold without exuding, but it is still thermoplastic enough to freely flow and fill a mold when compressed and heated.

The baking of the material under pressure is not essential, but it is desirable as bubbles in the product are thereby prevented. In the absense of pressure during baking there is a tendency to foam, with consequent irregular hardening or polymerization of the material, and furthermore discoloration may occur on account of local overhardening when bubbles are present.

The baking period can be varied within wide limits. However, the baking should be continued long enough to give a product that can be crushed and in addition to give a product that will set up or harden rapidly in a molding operation; on the other hand, the baking must be restricted to give a material in an intermediate state of hardness short of the final maximum infusible state and not beyond the state in which the material is capable of fusion and of reuniting or coalescing under the action of heat and pressure.

For the molding of articles the resinoid is warmed or heated to about 130° C. in an oven and a hot mold of about 170° C. is charged with it. A pressure of from 3000 to 5000 pounds per square inch is applied while the mold is maintained at about 170° C., and this is continued for about 5 to 6 minutes depending on the size and shape of the mold and the condition of the material. Higher or lower temperatures can be used during the molding period and the time cycle thus correspondingly shortened or increased. At the end of this period the mold is cooled to about 100° C. and the article is discharged from the mold; it is not necessary to cool the mold to this extent, but it is found desirable as the article is apt to be somewhat flexible and liable to distortion if discharged at materially higher temperatures. The molded article can be further heat treated or baked whereby its strength may be increased, particularly when the molding period is relatively short.

A resinoid when made and treated as above indicated, generally yields a molded article sufficiently strong and free from objectionable thermoplasticity for commercial use, but still so short of the final infusible condition that it can be again crushed and molded. However, a second molding operation or longer application of heat as a rule sets or hardens the resinoid to a degree that it will not crush and reunite in a third molding operation. As an alternative, the resinoid can be advanced during the baking stage somewhat further than indicated, so that but one molding operation may be possible.

In addition to the unique property which these partially hardened resinoids possess of being moldable, they are found to be light proof, that is, the color is not appreciably affected by exposure to light. They can therefore be pigmented or dyed to give a wide variety of color effects without danger of darkening or changing in color at a later period; in their natural state the resinoid compositions of this invention are of a pleasing lemon color. Furthermore, fillers and other agents known to the art can be incorporated to give opacity or otherwise vary the characteristics of the material without noticeably affecting the molding property.

A wide variety of articles have been molded from clear or clouded resinoids in accordance with this invention, such as shaving brush handles, umbrella handles, medallions, gear shift balls, ash trays, buttons, collar buttons, pipe bits, mouth pieces for instruments, etc.

I claim:

1. Process of preparing a resinoid composition which comprises reacting phenol, including a small portion of o-cresol, with hexamethylenetetramine in the proportion of 3 moles of the phenolic ingredient to 1 mole of hexamethylenetetramine and a plasticizing agent at a temperature of about 135° C. or more, checking the reaction as the mass approaches a thickened condition at a temperature of about 120 to 125° C. by pouring the mass into containers, and baking the poured resinoid under pressure to partially advance the resinoid to a condition where it can be crushed and reunited under the action of heat and pressure.

2. A moldable composition comprising the resinoid reaction product of substantially 1 mole hexamethylenetetramine and 3 moles of phenol including a small proportion of o-cresol and in admixture with liquid chlorcnaphthalene, said product being in a state of polymerization capable of being crushed and reunited under the action of heat and pressure.

3. A moldable composition comprising the resinoid reaction product of substantially 1 mole of hexamethylenetetramine and 3 moles of phenol in admixture with a plasticizing agent, said product being in a state of polymerization capable of being crushed and reunited under the action of heat and pressure.

4. A moldable composition comprising the resinoid reaction product of a phenol and hexamethylenetetramine substantially in the proportion of 3 moles of said phenol to each mole of hexa and in a state of polymerization capable of being crushed and reunited under the action of heat and pressure.

5. A moldable composition comprising the resinoid reaction product of a phenol and hexamethylenetetramine in the proportions of substantially 1 mole of hexamethylenetetramine to 3 moles of said phenol, said product being in a state of partial polymerization.

6. Process of preparing a moldable resinoid which comprises reacting a phenol and hexamethylenetetramine in proportions of substantially three to four moles of the phenol to one mole of the hexamethylenetetramine and bringing the resulting product to a state of polymerization capable of being crushed and reunited under the action of heat and pressure.

7. Process of preparing a moldable resinoid which comprises reacting phenol and a smaller proportion of a cresol with hexamethylenetetramine in proportions of about three to four moles of the phenolic ingredients to one mole of hexamethylenetetramine, and bringing the resulting product to a state of polymerization capable of being crushed and reunited under the action of heat and pressure.

8. A moldable composition comprising the resinoid reaction of a phenol and hexamethylenetetramine in proportions of substantially three to four moles of the phenol to one mole of the hexamethylenetetramine.

9. A moldable composition comprising the resinoid reaction product of a phenol and a smaller proportion of a cresol with hexamethylenetetramine in proportions of about three to four moles of the phenolic ingredients to one mole of hexamethylenetetramine.

10. Process of preparing a resinous product moldable in the absence of an inert filler which comprises reacting a phenol with hexamethylenetetramine under non-acid conditions and in amounts in which the proportion of hexamethylenetetramine is materially in excess of 1 mol to 6 mols of the phenol to a state of polymerization capable of being crushed and reunited in the mold without exudation under the action of heat and pressure into a homogeneous resistant article having a strength commensurate with one obtained from a cast product of like composition.

11. Process according to claim 10 which includes a retarding agent for the reaction.

12. Composition comprising a resinous reaction product of a phenol and hexamethylenetetramine reacted under non-acid conditions, the latter being present in amounts materially greater than in the ratio of 1 mol to 6 mols of the phenol, said composition being in a state of polymerization capable of being crushed and reunited in the mold without exudation under the action of heat and pressure into a homogeneous resistant article having a strength commensurate with one obtained from a cast product of like composition.

GEORGE S. WEITH.